United States Patent
Arellano

(10) Patent No.: US 9,045,108 B1
(45) Date of Patent: Jun. 2, 2015

(54) AIRBAG REINFORCEMENT MATERIAL AT AN AIRBAG GAS INLET

(71) Applicant: Toyota Motor Engineering & Manufacturing North America, Inc., Erlanger, KY (US)

(72) Inventor: Nora Arellano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/296,071

(22) Filed: Jun. 4, 2014

(51) Int. Cl.
  *B60R 21/231* (2011.01)
  *B60R 21/232* (2011.01)
  *B60R 21/214* (2011.01)
  *B60R 21/213* (2011.01)

(52) U.S. Cl.
  CPC ............. *B60R 21/231* (2013.01); *B60R 21/232* (2013.01); *B60R 21/23138* (2013.01); *B60R 21/214* (2013.01); *B60R 21/213* (2013.01)

(58) Field of Classification Search
  CPC .. B60R 21/232; B60R 21/213; B60R 21/214; B60R 21/23138
  USPC .............................................. 280/730.2, 741
  See application file for complete search history.

(56) References Cited

U.S. PATENT DOCUMENTS

| | | | |
|---|---|---|---|
| 5,637,385 A | 6/1997 | Mizuki et al. | |
| 5,797,621 A | 8/1998 | Ono | |
| 7,175,196 B2 * | 2/2007 | Boxey | 280/730.2 |
| 7,182,366 B2 * | 2/2007 | Enriquez | 280/730.2 |
| 7,226,075 B2 | 6/2007 | Nagata et al. | |
| 7,314,232 B2 | 1/2008 | Kashiwagi | |
| 7,328,911 B2 | 2/2008 | Chapman | |
| 7,578,520 B2 | 8/2009 | Palo et al. | |
| 7,661,705 B2 | 2/2010 | Jacobsson et al. | |
| 7,837,227 B2 | 11/2010 | Kuhne et al. | |
| 7,850,198 B2 | 12/2010 | Hayakawa et al. | |
| 8,439,396 B2 | 5/2013 | Padiyar et al. | |
| 8,500,162 B2 * | 8/2013 | Moffitt et al. | 280/730.2 |
| 2008/0122203 A1 | 5/2008 | Steinbach et al. | |
| 2012/0032422 A1 | 2/2012 | Dainese et al. | |

FOREIGN PATENT DOCUMENTS

JP      06-227344 A      8/1994

OTHER PUBLICATIONS

U.S. Appl. No. 13/904,288, filed May 29, 2013, Arellano.

* cited by examiner

*Primary Examiner* — Faye M Fleming
(74) *Attorney, Agent, or Firm* — Oblon, McClelland, Maier & Neustadt, L.L.P.

(57) ABSTRACT

An airbag apparatus includes an inflatable curtain airbag, an inflator to provide inflation gas to deploy the inflatable curtain airbag, and reinforcement material. The inflator is coupled to an end of the inflatable curtain airbag at an inflator outlet. The reinforcement material is attached to a portion of an outer surface of the inflatable curtain airbag. Upon deployment of the inflatable curtain airbag, the reinforcement material is disposed between the portion of the outer surface of the inflatable curtain airbag and an external object in a vicinity of the inflator outlet to reinforce the inflatable curtain airbag from an edge of the external object.

9 Claims, 6 Drawing Sheets

AIRBAG REINFORCEMENT MATERIAL AT AN AIRBAG GAS INLET

FIELD OF THE DISCLOSURE

The present disclosure generally relates to an airbag apparatus. More specifically, the present disclosure relates to an airbag reinforcement material for reinforcing a side curtain airbag at a gas inlet.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Airbag devices that are commonly employed in a vehicular machine such as an automobile, typically retain an inflatable airbag, folded or rolled, in a retainer in an undeployed state. When a vehicle is subjected to an impact load due to, for example, a collision, airbag devices rapidly inflate and deploy the inflatable airbag using an inflator that generates and ejects high-pressure inflation gas into the airbag. During an initial phase of deployment of the inflatable airbag, a portion of an airbag cushion that is close to an outlet of the inflator, i.e. a gas inlet of the inflatable airbag, is subjected to high pressurization due to the inflation gas that is rapidly ejected from the inflator into the inflatable airbag.

SUMMARY

It would thus be particularly advantageous to reinforce an inflatable airbag near the gas inlet.

In an aspect of the disclosure, an airbag apparatus includes an inflatable curtain airbag to deploy in an event of emergency of a vehicle, an inflator, and reinforcement material. The inflator is coupled to an end of the inflatable curtain airbag at an inflator outlet to provide inflation gas to deploy the inflatable curtain airbag. The reinforcement material is attached to a portion of an outer surface of the inflatable curtain airbag. Upon deployment of the inflatable curtain airbag in the vehicle during an emergency, the reinforcement material is disposed between the portion of the outer surface of the inflatable curtain airbag and an external object in a vicinity of the inflator outlet to reinforce the inflatable curtain airbag against edges of the external object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
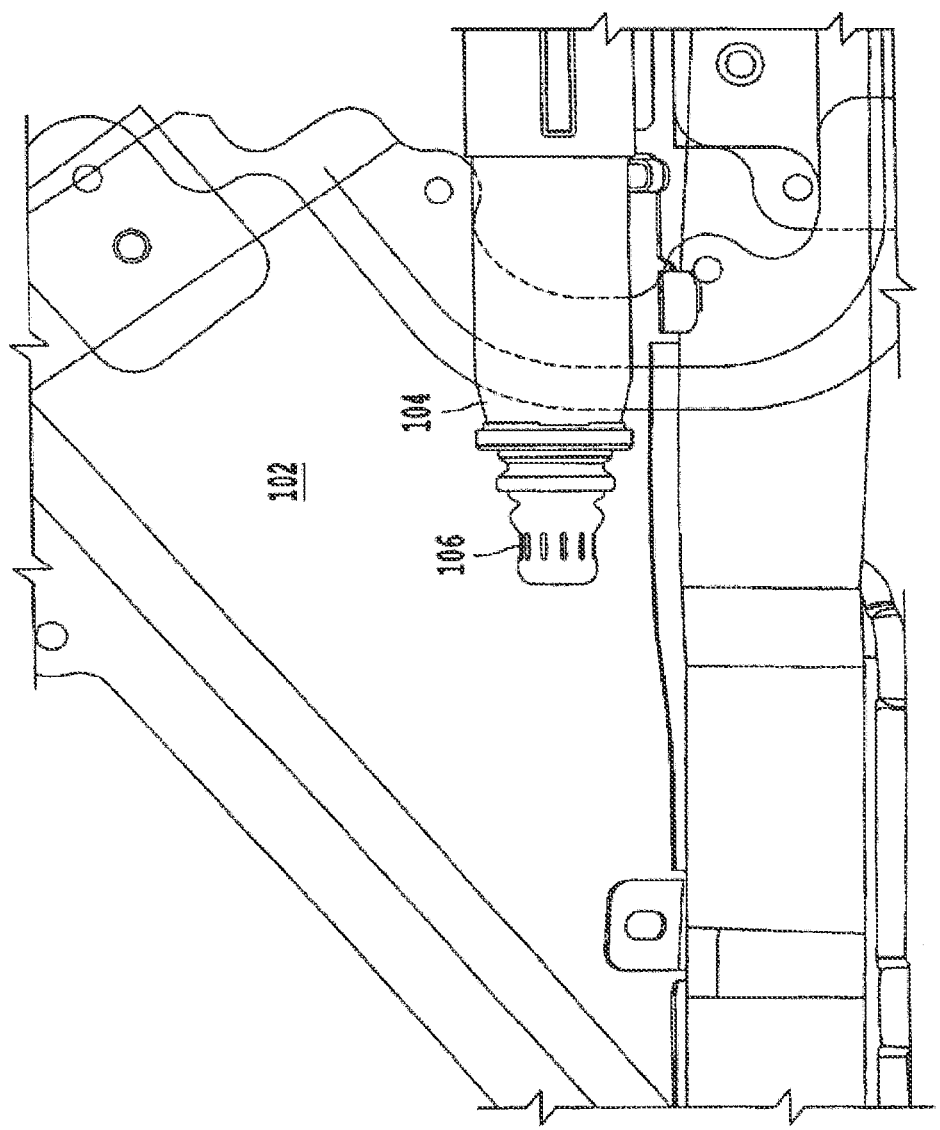
FIG. 1 is a side view of an illustrative side curtain airbag apparatus showing an area in the vicinity of an outlet of an inflator in accordance with an exemplary aspect of the present disclosure.

Referring now to the drawings, wherein like reference numerals designate identical or corresponding parts throughout the several views. Further, as used herein, the words "a," "an" and the like generally carry a meaning of "one or more," unless stated otherwise.

FIG. 1 is a side view of an illustrative side curtain airbag apparatus 102 showing an area in the vicinity of an outlet 106 of an inflator 104 in accordance with an exemplary aspect of the present disclosure. The side curtain airbag apparatus may be installed in a mobile machine such as an automotive vehicle (hereinafter "vehicle"). The outlet 106 of the inflator 104 is coupled to an inflatable airbag at a gas inlet of the inflatable airbag. In an event of a vehicle emergency, for example when the vehicle is subjected to an impact load due to a collision with an external object, the side curtain airbag apparatus 102 quickly deploys the inflatable airbag in response to the impact load to protect an occupant in the vehicle. According to an exemplary embodiment, the inflator 104 generates and ejects high-pressure inflation gas such as nitrogen gas into the inflatable airbag in response to an impact load to deploy the inflatable airbag in the vehicle.

Figure 2:
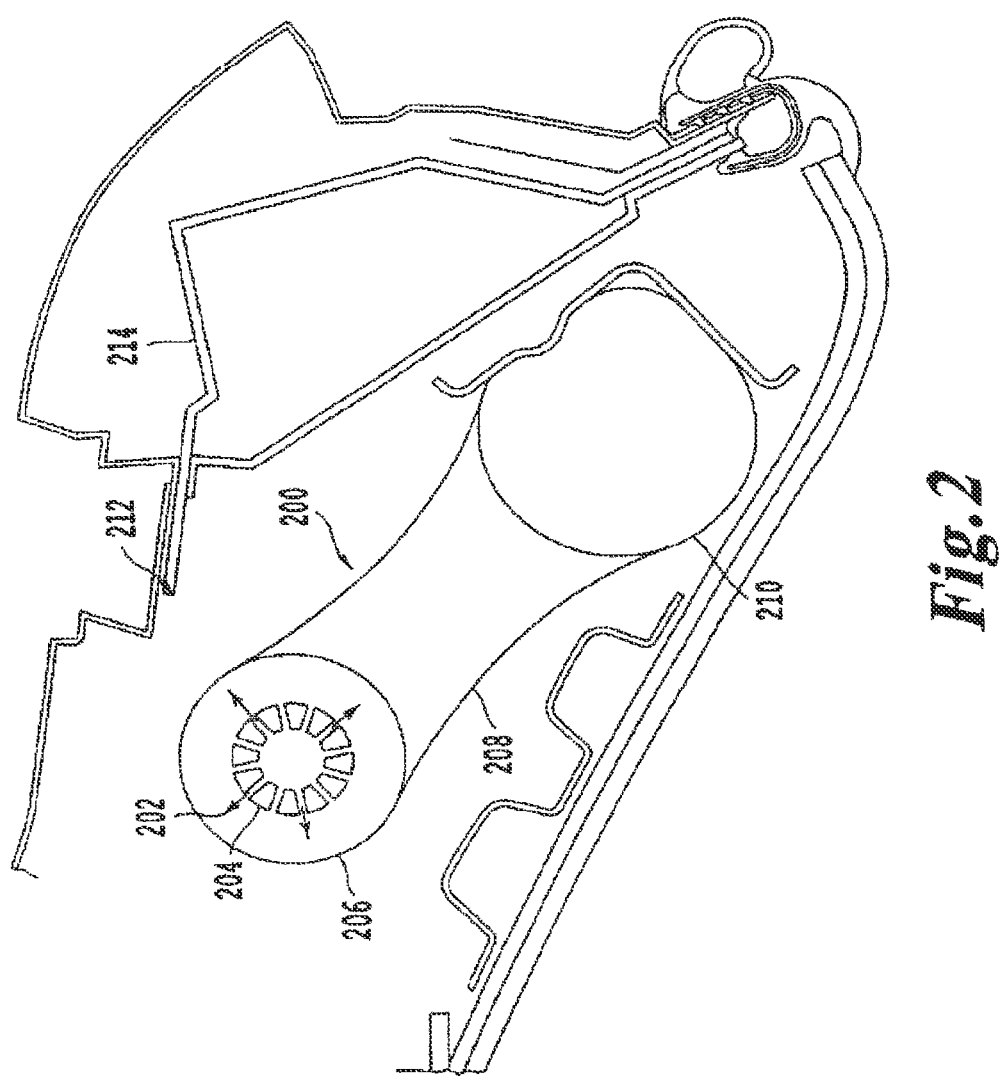
FIG. 2 is a view of an airbag cushion neck of the illustrative side curtain airbag apparatus in an uninflated state when no reinforcement material is attached to the airbag cushion neck in accordance with an exemplary aspect of the present disclosure.

FIG. 2 is a view of an airbag cushion neck 208 of the illustrative side curtain airbag apparatus 102 in an uninflated state when no reinforcement material is attached to the airbag cushion neck 208 in accordance with an exemplary aspect of the present disclosure. An inflatable airbag 200 is coupled to the inflator 104 at the outlet 106 of the inflator 104, and high-pressure inflation gas ejected from the inflator 104 flows into the inflatable airbag 200 upon initiation of deployment of the inflatable airbag 200. In an initial phase of deployment of the high-pressure inflation gas into the inflatable airbag 200, a portion of the high-pressure inflation gas flows in an axial direction toward a main cushion role 210 of the inflatable airbag 200. At the same time, a portion of the high-pressure inflation gas flows radially outward through radial gas exits 204 which inflates and pressurizes a portion 206 of the airbag cushion adjacent to the outlet 106 of the inflator 104 and the airbag cushion neck 208 in the radial direction 202. As a result, a portion of the inflatable airbag 200 adjacent to the outlet 106 of the inflator 104 experiences high pressurization during the initial phase of the deployment of the inflatable airbag 200.

Figure 3:
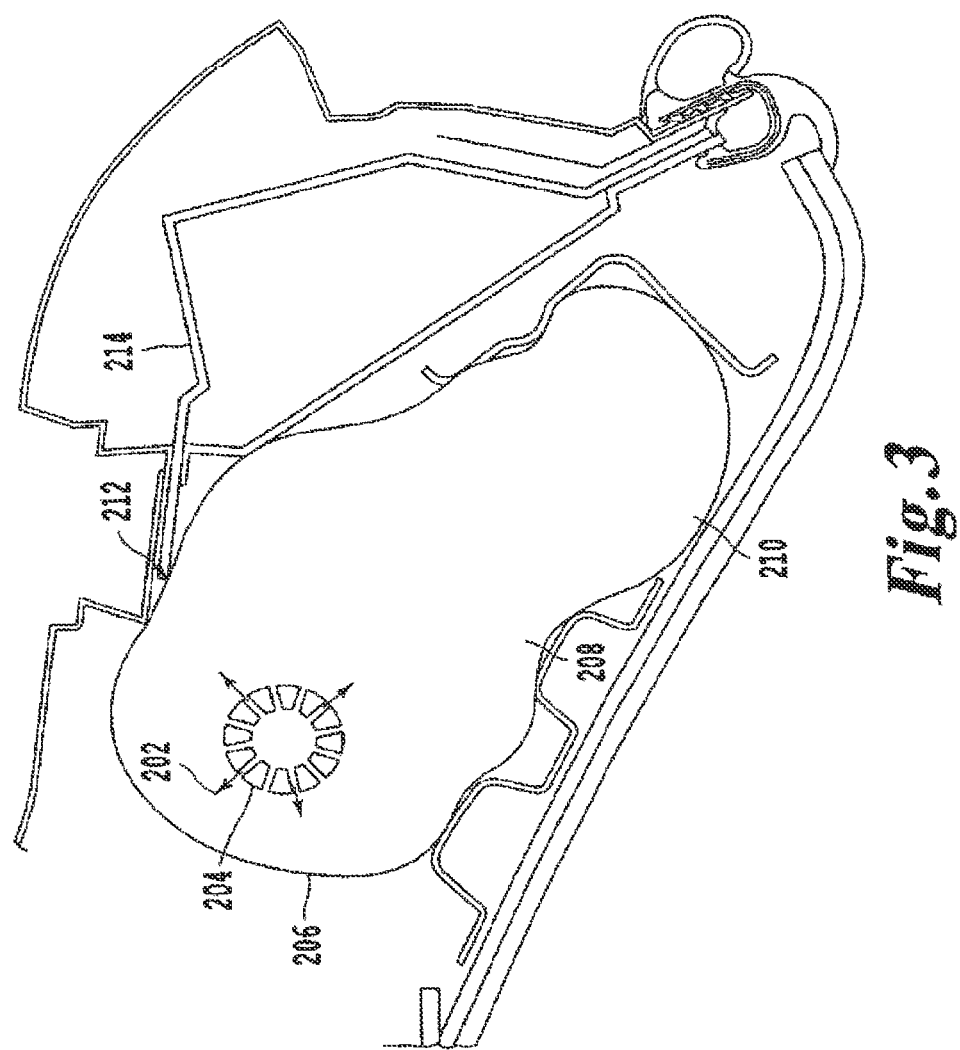
FIG. 3 is a view of the airbag cushion neck of the illustrative side curtain airbag apparatus in an inflated state when no reinforcement material is attached to the airbag cushion neck in accordance with an exemplary aspect of the present disclosure.

FIG. 3 illustrates when the inflatable airbag 200 is inflated, the airbag cushion can come into contact with edge 212 of the external body 214.

Figure 4:
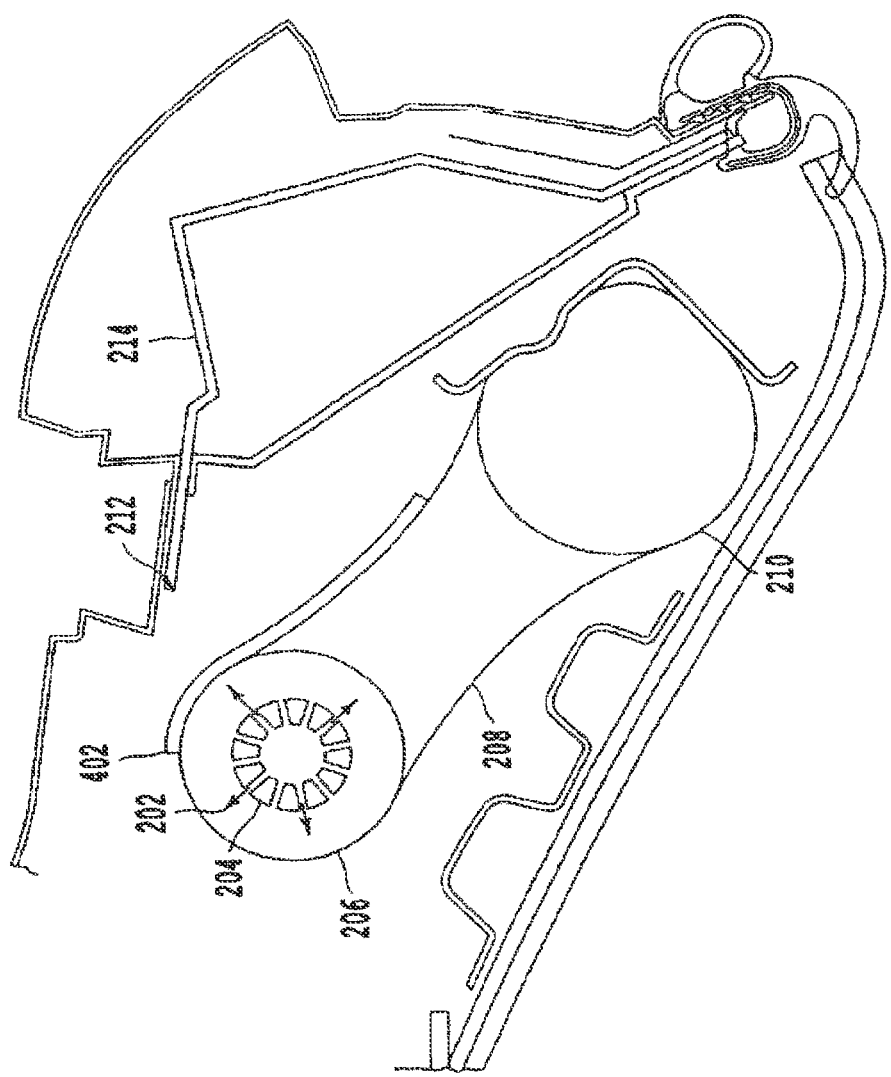
FIG. 4 is a view of the airbag cushion neck of the illustrative side curtain airbag apparatus in an uninflated state when reinforcement material is attached to the airbag cushion neck in accordance with an exemplary aspect of the present disclosure.

FIG. 4 is a view of the airbag cushion neck 208 of the illustrative side curtain airbag apparatus 102 in an uninflated state when a reinforcement material 402 is attached to the airbag cushion neck 208 in accordance with an exemplary aspect of the present disclosure. In an exemplary embodiment, as shown in FIG. 4, the reinforcement material 402 is attached to a portion of an outer surface of the inflatable airbag 200 to reinforce the airbag cushion from the edge 212 on the external body 214 when the inflatable airbag 200 is deployed. In particular, according to an embodiment, the reinforcement material 402 is attached to a portion of the outer surface of the inflatable airbag 200 such that upon deployment of the inflatable airbag 200, the reinforcement material 402 is disposed between the portion of the outer surface of the inflatable airbag 200 and the external body 214 in the vicinity of the outlet 106 of the inflator 104 to reinforce the inflatable airbag 200 from the edge 212 on the external body 214. Attachment of the reinforcement material 402 to the airbag cushion of the inflatable airbag 200 is advantageous since it provides increased resistance against the edge 212 into the airbag cushion.

Figure 5:
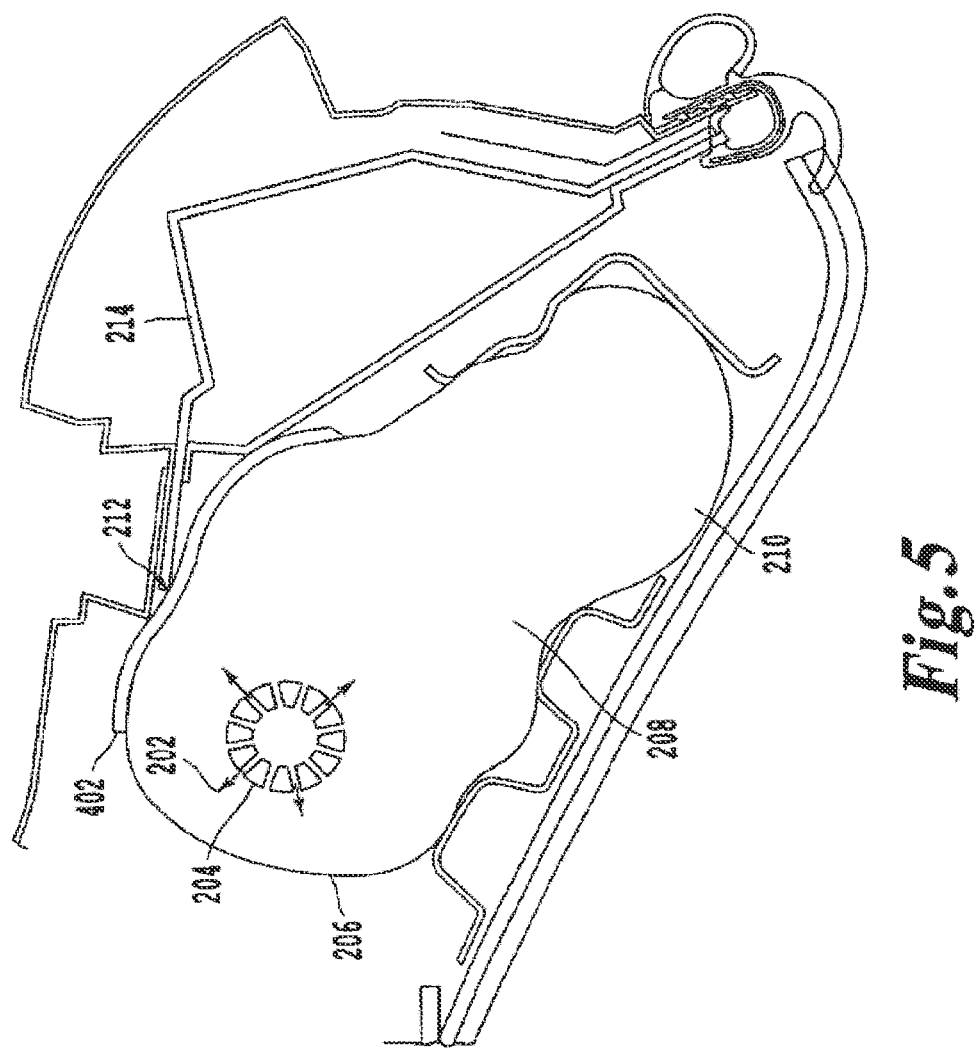
FIG. 5 is a view of the airbag cushion neck of the illustrative side curtain airbag apparatus in an inflated state when reinforcement material is attached to the airbag cushion neck in accordance with an exemplary aspect of the present disclosure.

FIG. 5 is a view of the airbag cushion neck 208 of the illustrative side curtain airbag apparatus 102 in an inflated state when reinforcement material 402 is attached to the airbag cushion neck 208 in accordance with an exemplary aspect of the present disclosure. As previously shown in FIG. 3, when the inflatable airbag 200 is inflated, the airbag cushion can come into contact with the edge 212 on the external body 214. However, in an exemplary embodiment, when the inflatable airbag 200 is inflated, the reinforcement material 402 is disposed between an outer surface of the inflatable airbag 200 and the external body 214 in the vicinity of the outlet 106 of the inflator 104, thereby the inflatable airbag 200 is reinforced from the edge 212.

Further, according to another embodiment, the reinforcement material 402 is attached to a portion of the outer surface of the inflatable airbag 200 such that upon deployment of the inflatable airbag 200, the reinforcement material 402 is disposed substantially only in areas where the edge 212 of the external body 214 is present. Accordingly, the reinforcement material 402 is attached only in areas where the airbag cushion could possibly come into contact with edges or weld burrs. For an illustrative purpose, the reinforcement material 402, as shown in FIGS. 4 and 5, is attached only on a side of the outer surface of the inflatable airbag 200 where the edge 212 is present. However, the reinforcement material 402 may be attached to the inflatable airbag 200 at multiple locations where edges or weld burrs could possibly be present. The reinforcement material 402 may be attached to the inflatable airbag 200 in a continuous manner or in a non-continuous manner such that only needed areas of the airbag cushion are covered with the reinforcement material 402.

Figure 6:
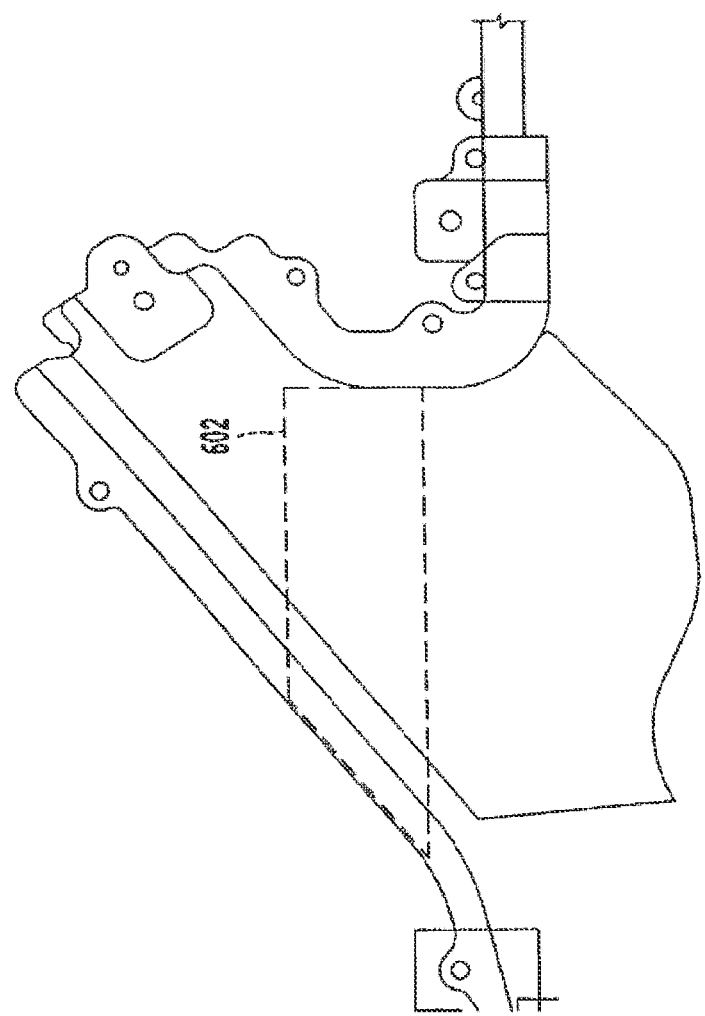
FIG. 6 is a side view of the illustrative side curtain airbag apparatus showing an exemplary area of the airbag cushion neck to be covered by the reinforcement material when an airbag is deployed in accordance with an exemplary aspect of the present disclosure.

FIG. 6 is a side view of the illustrative side curtain airbag apparatus 102 showing an exemplary area of the airbag cushion neck 208 to be covered by the reinforcement material 402 when an airbag is deployed in accordance with an exemplary aspect of the present disclosure. A dotted area 602 represents an exemplary area that the reinforcement material 402 attached to the inflatable airbag 200 covers when the inflatable airbag 200 is deployed. In reference to FIGS. 1 and 5-6, the dotted area 602 substantially covers the outlet 106 of the inflator 104 and the airbag cushion neck 208 when the inflatable airbag 200 is deployed. Therefore, the reinforcement material 402 is present and reinforces the vicinity of the outlet 106 of the inflator 103 and the reinforcement material is disposed between the inflatable airbag 200 and any possibly locations that the inflatable airbag 200 could come into contact with edges of the external body or possible weld burrs.

According to an exemplary aspect of the present disclosure, the reinforcement material 402 is car seat belt material. Car seat belt material has shown sufficient strength and flexibility through rigorous experimentation. However, the reinforcement material 402 is not limited to the car seat belt material. For example, the reinforcement material 402 may be fabric, plastic, or any flexible composite material (for example polyurethane-based carbon or fibre-glass).

In an embodiment, the reinforcement material 402, for example car seat belt material, is sewn or stitched to the outer surface of the inflatable airbag 200. However, the method of attachment is not limited to sewing or stitching. For example, the reinforcement material 402 may be glued to the outer surface of the inflatable airbag 200.

According to an exemplary aspect of the present disclosure, the reinforcement material 402 is attached in areas of the airbag cushion that could possibly come into contact with edges during initial deployment. Accordingly, the reinforcement material 402 could be added without affecting the overall packaging size and there is no need to change the headliner shape or the body shape for more clearance. Further, the reinforcement material 402 can be added in a location that does not affect the main cushion design.

Thus far, application of the reinforcement material 402 according to an exemplary aspect of the present disclosure was described using a side curtain airbag system. However, application of the reinforcement material 402 according to an exemplary aspect of the present disclosure is not limited to a side curtain airbag system. For example, the reinforcement material 402 described in the present disclosure can be applied to other types of airbag systems such as frontal airbag systems and various other side-impact airbags.

The foregoing disclosure describes merely illustrative embodiments of the present invention. As will be understood by those skilled in the art, the present invention may be embodied in other specific forms without departing from the spirit or essential characteristics thereof. Accordingly, the disclosure is intended to be illustrative of the present invention, but not limiting of the scope of the invention, as well as the following claims.

What is claimed is:

1. An airbag apparatus comprising:
an inflatable curtain airbag to deploy in an event of emergency of a vehicle;
an inflator coupled to an end of the inflatable curtain airbag at an inflator outlet to provide inflation gas to deploy the inflatable curtain airbag; and
reinforcement material attached to a portion of an outer surface of the inflatable curtain airbag including around the outlet of the inflator to reinforce the inflatable airbag during deployment in an emergency of a vehicle,
wherein upon deployment of the inflatable curtain airbag in the vehicle during an emergency, the reinforcement material is disposed between the portion of the outer surface of the inflatable curtain airbag and an external object in a vicinity of the inflator outlet to reinforce the inflatable curtain airbag against edges of the external object.

2. The airbag apparatus of claim 1, wherein the reinforcement material is attached to the portion of the outer surface of the inflatable curtain airbag such that upon deployment of the inflatable curtain airbag, the reinforcement material is disposed substantially only in an area where there are edges of the external object present.

3. The airbag apparatus of claim 2, wherein the area is a cushion neck of the inflatable curtain airbag.

4. The airbag apparatus of claim 1, wherein in an initial phase of deployment of the inflation gas into the inflatable curtain airbag, a portion of the inflation gas flows radially outwardly through radial gas exits and pressurizes a portion of the inflatable curtain airbag adjacent to the inflator outlet in a radial direction, which causes the portion of the inflatable curtain airbag adjacent to the inflator outlet to come into contact with the edges of the external object.

5. The airbag apparatus of claim 1, wherein the inflatable curtain airbag is a curtain side airbag.

6. The airbag apparatus of claim 1, wherein the edge of the external object is an edge of sheet metal.

7. The airbag apparatus of claim 1, wherein the edge of the external object is a weld burr.

8. The airbag apparatus of claim 1, wherein the reinforcement material is car seat belt material.

9. The airbag apparatus of claim 8, wherein the car seat belt material is sewn to the portion of the outer surface of the inflatable curtain airbag.

* * * * *